June 5, 1928.
P. E. WILLIAMS ET AL
CLEAR VISION DEVICE
Filed May 10, 1926  2 Sheets-Sheet 2
1,672,635
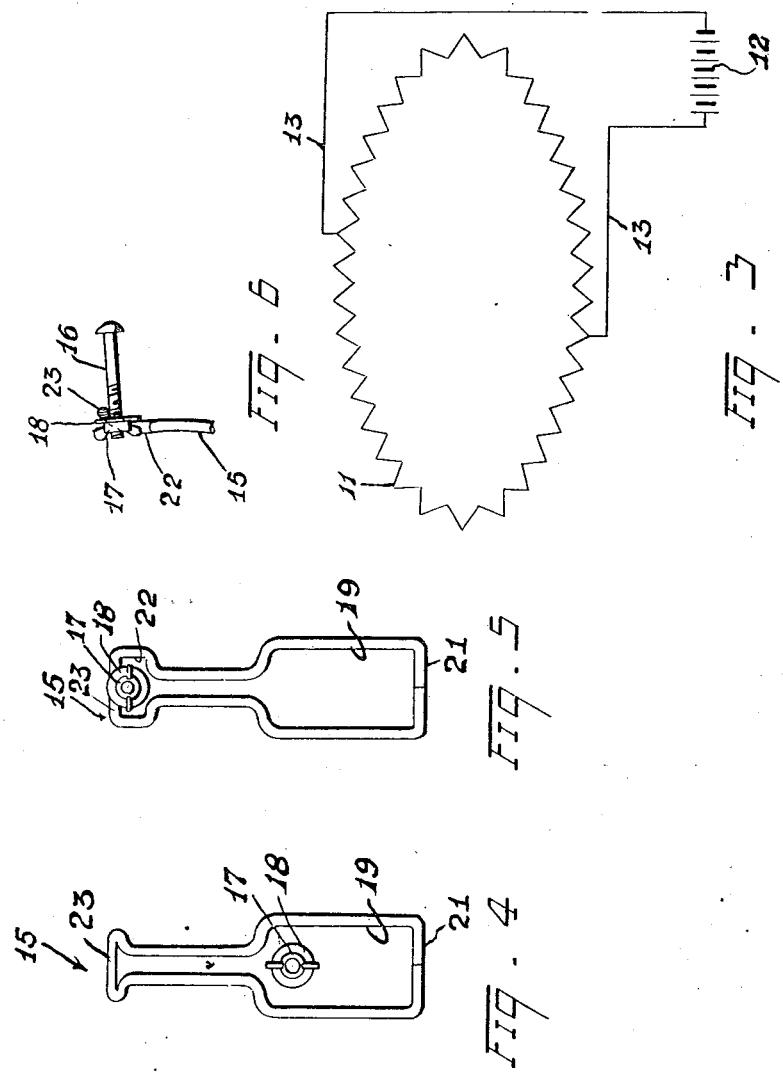
INVENTOR
Peter E. Williams & Harlan D. Akins
BY
ATTORNEY Patented June 5, 1928.

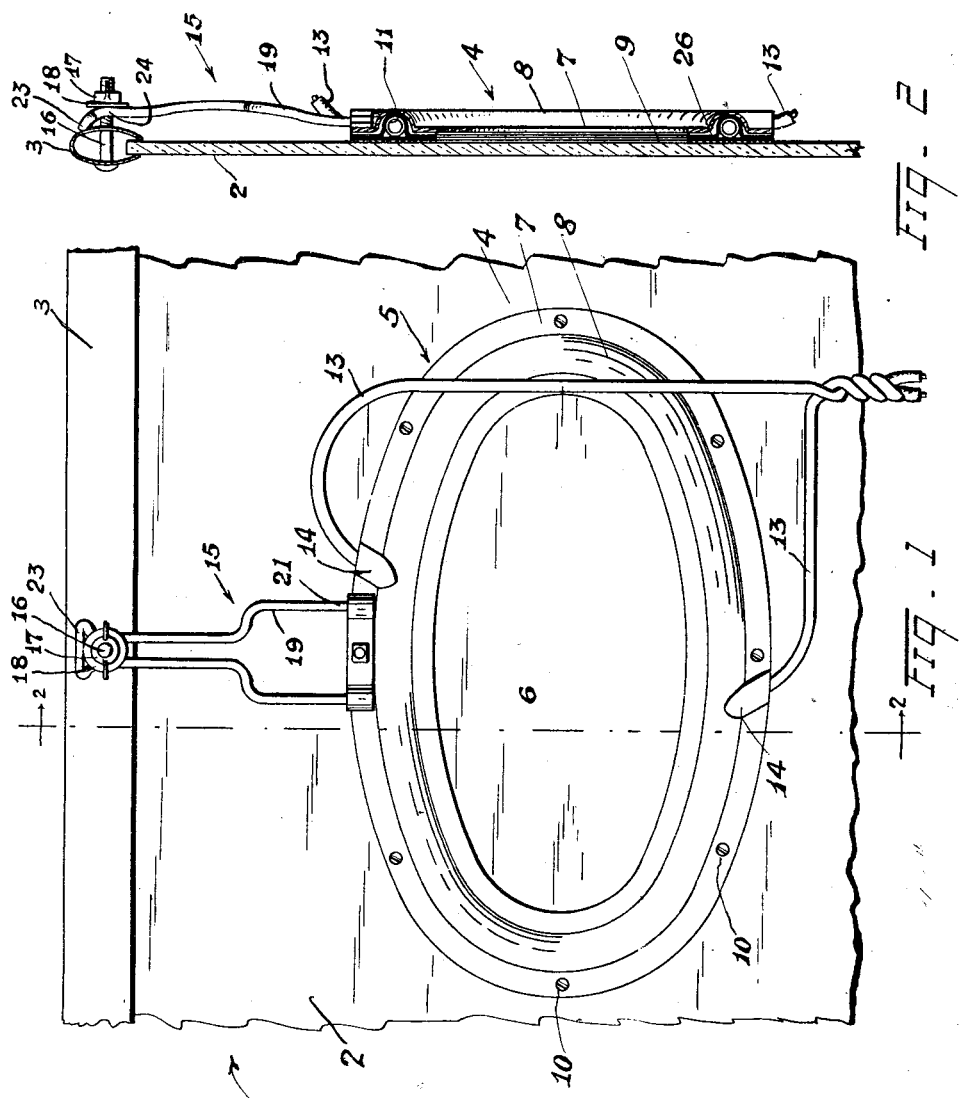

1,672,635

UNITED STATES PATENT OFFICE.

PETER E. WILLIAMS AND HARLAN D. ATKINS, OF WALLA WALLA, WASHINGTON.

CLEAR-VISION DEVICE.

Application filed May 10, 1926. Serial No. 107,886.

This invention relates to clear vision devices, more particularly adaptable to windshields of automobiles, and has as one of its objects to provide a device that will afford clear vision over a certain area regardless of climatic conditions.

Another object of the invention is to provide a clear vision device that will dissipate moisture, and frost, or snow, from windshields or other glass exposed to the elements.

A further object of the invention is to provide a device that may be readily attached to, or detached from, a windshield, and that will maintain the device in contact with the surface to be cleared without rattling.

A further object of the invention is to provide a device that is simple, efficient and durable, that is cheap to manufacture, and that is easy to apply.

With these and other objects in view reference is now had to the accompanying drawings in which:

Fig. 1 is a front elevation of the device;

Fig. 2 is a vertical section of the device, taken on the line 2—2 of Fig. 1;

Fig. 3 shows the wiring diagram of the heating element;

Fig. 4 shows a front view of one form of fastening means;

Fig. 5 shows a modified form of fastening means; and

Fig. 6 portrays one step in a method of attaching the device to its bolt without removing the nut.

Having reference to the drawings like numerals refer to like parts throughout the several views and the numeral 1 refers to a windshield consisting in part of a glass 2, and a windshield frame 3.

While a windshield is described throughout the specifications in connection with the invention, it is understood that the device is applicable to any window having a frame.

Attached to the windshield, in a manner to be explained, is a radiator 4 comprising a frame 5, preferably of oval form as shown in Fig. 1, and containing a vision aperture 6, the frame consisting of a cap 7, having a raised portion 8 formed therein, and a radiating plate 9 attachable to the cap by means of screws 10.

The plate and frame is designed to conform to the surface to be heated, and by close contact therewith, for greatest efficiency.

The vision aperture 6 is formed in both the cap and plate and is of an elongated area to provide for ample vision, and the frame contains within the raised portion 8 of the cap a heating element that, in this case, consists of a resistance coil 11 that is fed electrically from a storage battery 12.

As the coil has a relatively great linear dimension to encompass the vision aperture the lead wires 13 attached thereto are connected to the coil at points opposite to provide for uniform heating across its narrow part throughout its length, and openings 14 are provided in the cap to receive the said lead wires.

The radiator 4 is detachably attached to the windshield by means of a yielding yoke 15 designed for mounting on a bolt 16 that rests in the windshield frame 3.

The bolt 16 is provided with a thumbnut 17 and a washer 18, and the yoke has an enlarged portion 19 that will permit the passage of the nut 17 through that portion without its removal from the bolt, and a narrowed portion 20, against which the nut and washer will seat when securing the device to the windshield.

The enlarged portion may occur at the lower end 21 of the yoke, laying adjacent to the radiator as shown in Fig. 4, or at the upper end 22, as shown in Fig. 5, the purpose being to provide a means for readily detaching or attaching the device to the windshield.

The yoke is curved to rest its upper tip 23 against the frame of the windshield, when attached, and is formed to provide a sort of a cam, as at 24, against which the nut 17 can be screwed, and the cam is designed so that by tightening the nut the plate will be brought tightly against the glass to form a firm contact therewith for radiating purposes, and to maintain the radiator in that position to prevent the radiator from rattling against the glass.

In use the bolt is mounted in the windshield frame directly above the point where the line of vision intersects the glass for best observation.

With the bolt and nut in place the enlarged portion of the yoke is passed over the nut, and the narrowed portion is brought behind the nut until the cam is in a position between the nut and the windshield frame. This brings the end of the yoke in contact with the windshield frame to act as a fulcrum, and as the nut is screwed down against the yoke the radiator is yieldingly brought against the glass to firmly press thereagainst.

The electric leads are now connected to the battery in the usual manner (not shown) and as the electric circuit is completed the flow of electricity will pass in two directions through the heating element, and due to its resistance the radiator will become uniformly heated.

By means of the elongated radiator plate a relatively narrow opening is provided across which the heat will be communicated to the glass more evenly and with less current consumption and, the temperature of the glass now being higher than the outer temperature, all snow, or the like, will be softened or melted to a state that it will either run off by gravity or will be in a condition for removal by a windshield swipe if that device is available.

When climatic conditions are such that the device is not needed the thumbnut will be loosened and the radiator removed in the reverse manner to that used for attaching.

The flatness of the device provides for packing in a very small space.

Asbestos 26, shown by the heavy black line in Fig. 2, is used to cover the heating element in the usual manner of construction of such elements.

Having thus described our invention, we claim:

In a clear vision device, the combination of a radiator having a relatively narrow vision opening and comprising a frame consisting of a raised cap, a radiating plate covering the cap and adapted to encircle and conform to the surface to be cleared, oppositely positioned openings forming outlets to the said raised portion, a heating element contained within the raised portion, and having oppositely positioned lead wires adapted to pass from said raised portion through said outlets, and means to yieldingly maintain said radiating plate in contact with the surface to be cleared comprising a yoke attached to said frame and adapted for adjustable and removable mounting on a securing bolt.

In testimony whereof we affix our signatures.

PETER E. WILLIAMS.
HARLAN D. AKINS.